July 6, 1965 H. W. SILSBY III, ET AL 3,193,281

DOCUMENT FEEDING APPARATUS

Filed July 9, 1962 3 Sheets-Sheet 1

INVENTORS

Howard W. Silsby, III & James W. Taylor

BY Mason, Fenwick & Lawrence

ATTORNEYS

INVENTORS
Howard W. Silsby, III &
James W. Taylor
BY
Mason, Fenwick & Lawrence
ATTORNEYS INVENTORS
Howard W. Silsby, III &
James W. Taylor
BY
Mason, Fenwick & Lawrence
ATTORNEYS United States Patent Office 3,193,281
Patented July 6, 1965

3,193,281
DOCUMENT FEEDING APPARATUS

Howard W. Silsby III, Annandale, and James W. Taylor, Woodbridge, Va., assignors to Farrington Electronics Inc., Alexandria, Va., a corporation of Massachusetts
Filed July 9, 1962, Ser. No. 208,432
4 Claims. (Cl. 271—11)

The present invention relates in general to apparatus for feeding documents along a selected document advancement path and regulating the position of the documents, and more particularly to document feed apparatus for use with high-speed automatic character sensing equipment for advancing documents through the reading station in the scanning assembly of such equipment and automatically controlling the position thereof with respect to the reading station.

The present invention, while being subject to numerous applications which will be apparent to persons skilled in the art to which the invention pertains, is particularly applicable to the field of automatic character sensing, and the ensuing description will be directed to the use of the present invention in connection with automatic character sensing equipment. The description of the manner of application of the present invention in the field of automatic character sensing will be adequate to enable persons skilled in the art to understand the manner of its use in other applications.

Automatic character sensing equipment has been heretofore devised for sensing information-bearing documents and producing electrical output signals identifying information sensed by the apparatus. Such equipment may briefly be described as apparatus for scanning intelligence-bearing documents containing items of information such as printed characters, usually in the form of alphabetical letters and arabic numerals, which apparatus senses the presence and/or absence of bits of each character thereon with reference to a time and/or positional base and relation, and produces signals indicative of the presence and absence of such bits of characters within the scanning field, an output being produced at some time indicative of the character read.

Examples of typical automatic character sensing apparatus are disclosed in U.S. Patent No. 2,663,758 granted December 22, 1953 to David H. Shepard and U.S. Patent No. 2,897,481 granted July 28, 1959 to David H. Shepard. It should be understood however, that the apparatus of the present invention may be used to advantage in conjunction with many different types of automatic character sensing equipment wherein the requirements of operational reliability satisfied by the present invention are present.

Such automatic character sensing equipment has come into popular use as the means for converting printed material to a form acceptable as an input to present-day high-speed computers and other data-processing machines. As the speed of operation of automatic data processing machines has increased, so the speed of operation of the character-recognition equipment must be increased if the data processing systems are to process data at their full capabilities.

In processing character-bearing documents from a stack of documents or other document storage source through the reading station of automatic character sensing equipment, the document transport should be positively controlled and yet extremely flexible. From a practical standpoint, the document feed apparatus should feed the documents one at a time without difficulty even though the document pages may have slightly damaged edges incurred as a result of normal handling. Feed jams or double feeds cannot be tolerated in a commercially practical high-speed character reading machine. Thus extremely effective means of document separation, pickup and transport to the scanning station must be provided. Where an oscillating sweep mirror movable about a stationary pivot axis is provided to scan the lines of characters on the document at the reading station, reliable transition of the document from a flat to a concavely curved surface concentric with the mirror pivot axis should be provided so that a constant length optical path can be maintained between the printed characters on the page and the oscillating sweep mirror. It is also necessary to have an automatic physical adjustment of the page position at the reading station in order to locate the printed information properly in relation to the scanning sweep.

An object of the present invention, therefore, is the provision of novel apparatus for feeding documents at high speed to a selected station such as the reading station of high-speed automatic character sensing equipment which meets the operational requirements set forth above.

Another object of the present invention is the provision of novel apparatus for feeding documents at high speed to a selected station such as the reading station of high-speed automatic character sensing equipment, wherein effective transport of documents one page at a time from a stack of documents to the reading station is provided.

Another object of the present invention is the provision of novel apparatus for feeding documents at high speed to a selected station such as the reading station of high speed automatic character sensing equipment, wherein means are provided to facilitate transition of each page from a flat feed tray to a concavely curved surface at a reading station to permit scanning of a line of characters along a constant length optical path.

Another object of the present invention is the provision of novel document feed apparatus for feeding documents to the reading station of high-speed automatic character sensing equipment and the like wherein means are provided to effect automatic physical adjustment of the document position in the reading station to locate the printed information properly in relation to a scanning sweep.

Another object of the present invention is the provision of novel document feed apparatus for feeding documents to the reading station of high-speed automatic character sensing equipment and the like wherein means are provided for varying the line advance of the document through the reading station to permit advancement of the document in steps of different selected numbers of lines.

Another object of the present invention is the provision of novel document feed apparatus for feeding documents to the reading station of high-speed automatic character sensing equipment and the like wherein means is provided for effecting rapid travel of the document from the reading zone to thereby reduce total transport cycle time.

Other objects, advantages, and capabilities of the present invention will become apparent from the following detail description, taken in conjunction with the accompanying drawings illustrating a preferred embodiment of the invention.

Figure 1:
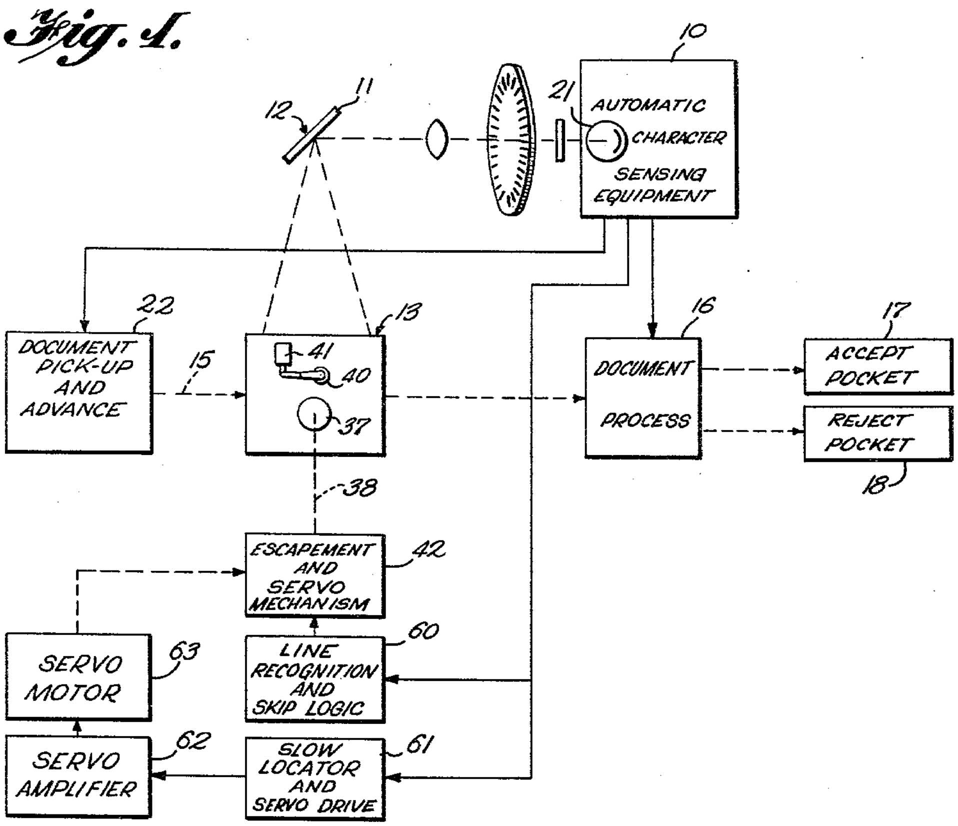
FIGURE 1 is a block diagram illustration of the document feed apparatus embodying the present invention and certain associated electronic components of automatic character sensing equipment with which the same is associated.
Figure 2:
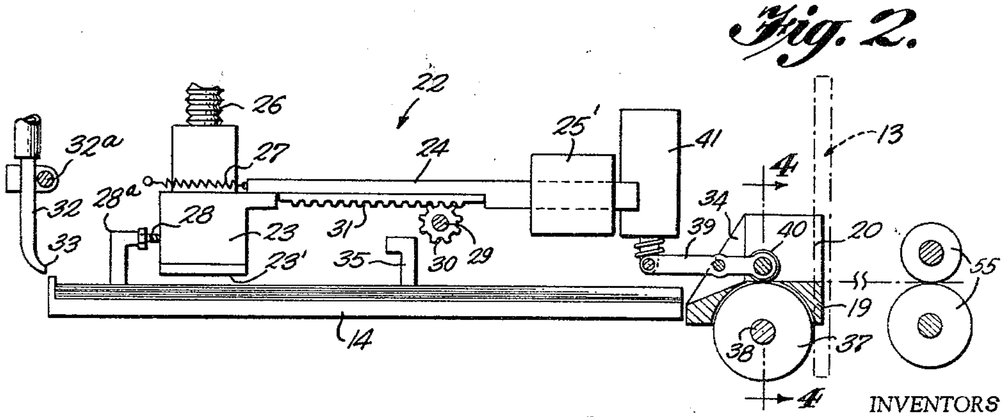
FIGURE 2 is a diagrammatic side elevation of the document pickup and line advance mechanism.
Figure 3:
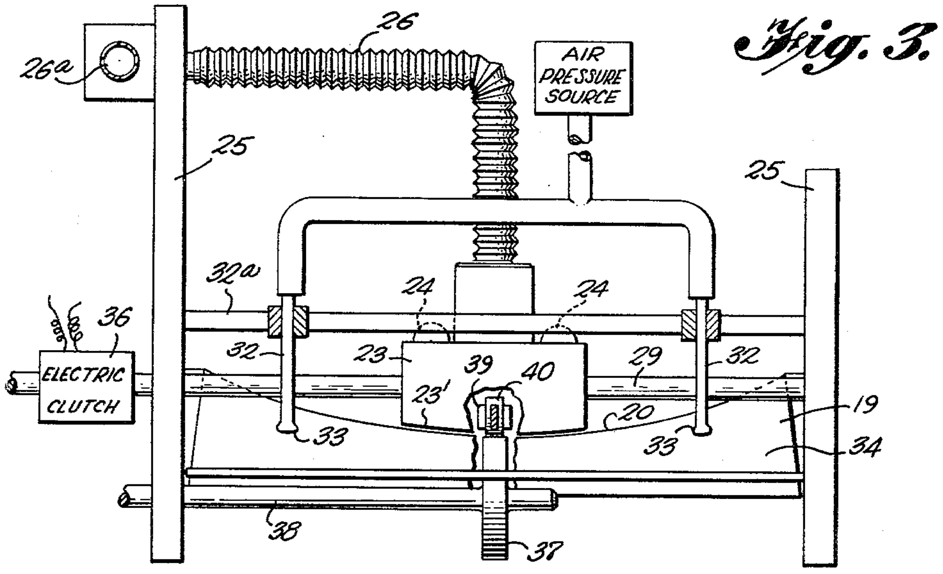
FIGURE 3 is an end elevation of the document pickup and line advance mechanism viewed from the left-hand side of FIGURE 2.
Figure 4:
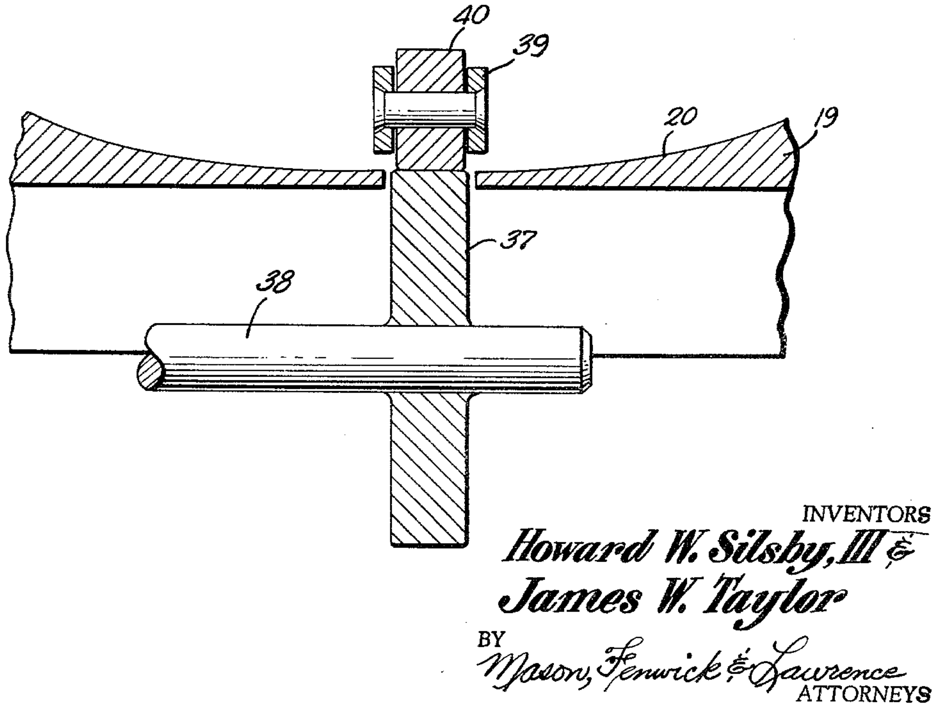
FIGURE 4 is a vertical transverse section view taken along the line 4—4 of FIGURE 2.

The apparatus of the present invention is designed to effect reliable and rapid transport of documents, such as single pages of paper for example of 8 by 10 inch size, through the reading station of the scanning assembly of automatic character sensing equipment designed to read the characters in character-by-character fashion along each successive line of characters on the page or along a selected line or lines of characters on the page. To this end, scanning of the characters at the reading station progresses along a transverse or lateral scanning trace extending horizontally or in parallelism with the lines of characters from one end of the line to the other to expose suitable detecting means to the image of one character after another along each line of characters being read. In addition to the lateral scanning of the document and line of characters, the scanning system may also include means to effect detail scanning of individual characters being scanned along axes inclined to the axis of the lateral page scanning trace, as for example, along axes perpendicular to the line of characters. To avoid confusion in the ensuing description, the term lateral reading zone scan will be employed to designate the scan which transverses the document laterally in parallelism with the lines of characters, and the term detail character scan will be employed to designate scanning of the area of an individual character or the image thereof.

A specific example of an optical scanning system with which the present document feed mechanism may be associated involves an oscillating mirror, prism, or similar optical reflecting element which is supported for pivotal movement through a preselected arc about a stationary pivot axis located above the document feed path and arranged perpendicular to the axes of the lines of characters on the documents being fed to sweep or scan rectilinearly across the document and thereby direct reflected light emanating from areas of the document progressing from a point adjacent one lateral margin to the opposite lateral margin in a continuous manner defining in effect a lateral scanning trace across the document paralleling the lines of characters.

The feed mechanism of the present invention includes means for separating one document at a time from a stack of documents in a feed tray and feeding the same through the reading station of the scanning assembly, together with means for controlling the movement of the document past the reading station and, depending on whether the document has ben accepted or rejected by the automatic character sensing equipment, stacking the document in an accept or a reject pocket. The document feed mechanism includes means for locating the first line of information when a document is fed to the reading station regardless of the distance from the start of the document to the first line of information. Additionally, the feed system includes variable line advance means which advances the document one, two or three lines at a time through the reading station and which may also move out the entire document if so desired, and line positioning means which precisely locates the information to be read relative to the reading station by adjusting the document position when the first line advances into the reading zone. Further, since the scanning mirror oscillates about a fixed axis, a concavely curved reading station tray is provided at the reading station to impart uniform curvature to the document concentric with the mirror axis to provide a constant length optical path between the printed characters and the mirror and a curved entrance throat to the reading station tray provides transition of the documents from a flat to a concavely curved configuration.

Referring to the drawings, wherein like reference characters designate corresponding parts throughout the several figures, the automatic character sensing equipment with which the document feed of the present invention is associated is indicated generally by the reference character 10, and includes a scanning assembly having a sweep mirror 11 supported for oscillation about a stationary pivot axis 12 above and parallelling the path of document advance through the reading station indicated generally at 13. Documents to be read are fed from an input document support 14 along a document feed path 15 to the reading station 13, and thence to a document process mechanism 16 by which the documents are sorted and advanced, discharged or otherwise fed to separate bins or pockets, such as accept pocket 17 or reject pocket 18. A reading station document support 19 is provided at the reading station having a concavely curved upper surface 20 against which the documents are urged to cause the documents to assume the configuration of a concave cylindrical arc concentric with the pivot axis 12 of the mirror 11. The mirror 11 may be driven in an oscillatory manner back and forth by a sweep mirror cam and linkage mechanism or other suitable means to scan a laterally elongated reading zone extending transversely of the document feed path or parallel to the lines of characters or the documents, the reading zone having a length to span a whole line of characters and a height which somewhat exceeds the character height. Light reflected from the document along the incident light paths to the oscillating mirror at all angular positions of the mirror is reflected toward a suitable detector photocell or photomultiplier tube 21. The curvature of the concave cylindrical surface 20 of the reading station document support 19 is such as to render the document concentric with the pivot axis of the mirror 11, so as to maintain a uniform document-to-mirror distance at all positions of the mirror. Suitable means are also provided to illuminate the document at the reading station, such as stationary lamps or preferably a light projection and oscillatory mirror system wherein movement of the illuminating mirror is coordinated with the mirror 11 to effect high intensity illumination of the particular portion of the reading zone being reflected by the mirror 11 toward the detector 21.

In addition to the lateral reading zone scan, a detail character scan is provided by the scanning system of the herein described embodiment, which is of the type disclosed in the earlier U.S. Patent No. 2,978,590 to David H. Shepard granted April 4, 1961. Such a detail character scanning means includes a rotatable scanning disk having a series of rectilinear radial slits near its periphery and a stationary slit plate having a pair of parallel slits oriented tangentially of the disk interposed in the path of the reflected light from the mirror 11 to the detector tube 21, together with a lens system for imaging the characters on the scanning disk, to provide detail scanning of each character image along two parallel scan lines extending vertically of the characters.

The document feed mechanism of the present invention operates through a complete feed cycle to perform four distinct yet smoothly integrated operations, including document pickup, document advance, line registration, and document escapement. The document pickup mechanism is indicated generally by the reference character 22 and overlies the input tray 14. The document input tray 14 is loaded so that the printed data is facing up and the page top is toward the horizontal center of the machine. The document pickup mechanism 22 includes a vacuum pickup head 23 having a convex lower surface 23' which conforms to the curvature of the concave upper surface 20 of the reading station document support 19, the pickup head 23 being supported on horizontal guide rods 24 supported in suitable bearings 25' fixed to a main frame 25. A flexible hose or suction conduit 26 having a control valve **26*a* therein couples the pickup head 23 with a suitable suction source. A return spring 27 normally biases the guide rods 24 and pickup head 23 to a return or quiescent position defined by a rear stop 28 adapted to abut a fixed member 28*a*** of the supporting frame 25, wherein the pickup head 23 overlies the back or trailing edge portion of the uppermost document so that the front or leading edge of the document is free to be fed to the reading station. Reciprocative movement of the pickup head and guide rod assembly is effected by means of a feed shaft 29 and feed gear 30 keyed thereto, the teeth of which mesh with a rack 31 intercoupled with the guide rods 24 so that rotation of the feed shaft 29 causes the whole guide rod assembly to drive forward toward the reading station 13. In order to avoid the possibility of adhesion of pages together due to static electricity, which could result in two or more pages being elevated together by the pickup head 23 and fed to the reading station, low pressure air blast riffler tubes 32 supported on a crossbar 32*a* of the frame are disposed so that their discharge nozzles 33 are adjacent the trailing edges of the documents in the input document support 14. The riffler tubes 32 are supplied with compressed air from a suitable source and are adjustably positioned so that the flow of air from the discharge nozzles 33 is perpendicular to the trailing edge of the documents to cause vibration of the documents when they are picked up by the pickup head 23 and dislodge any excess documents.

As the pickup head 23 is driven from its return or rest position by rotation of the feed shaft 29 and gear 30, the document held by the pickup head 23 is fed through a curved entrance throat 34 at the inlet to the reading station document support 19 which effects a smooth transition of the documents from a flat to a concavely curved configuration. A front stop 35 supported on the frame 25 is positioned in the path of movement of the pickup head 23 to engage the pickup head at the forward end of its advance stroke and prevent the guide rod assembly from passing off of the feed gear 30 and assure uniform feeding movement for each document.

The feed shaft 29 is interrupted by an electric clutch 36 which is controlled by control pulses generated in the machine in any suitable manner after a document has been picked up by the pickup head to effect energization of the clutch 36 to drive the feed shaft 29 in a direction to effect document advancing movement of the guide rod assembly.

The reading station document support 19 is provided with a drive wheel 37 keyed to a shaft 38, which drive wheel 37 is located approximately at the transverse center of the document feed path and extends into engagement with the documents which are fed to the reading station document support 19. Above the concave surface 20 of the reading station document support 19 is a clamp lever 39 pivoted to a stationary support intermediate its ends and having a clamp roller 40 on one end thereof centered directly over the drive wheel 37. The opposite end of the clamp lever 39 is coupled to the plunger of a solenoid 41 controlled by signals from the machine. After the document being carried forward by the pickup head 23 enters through the curved entrance throat 34 of the reading station document support 19, the document is fed between the clamp lever roller 40 and the drive wheel 37. When the document is between the clamp lever roller 40 and drive wheel 37, the solenoid 41 is activated to cause the clamp lever 39 to clamp the document against the drive wheel 37. At this time, the air valve 26*a* closes, removing the suction from the pickup head 23 and the electric clutch 36 is released allowing the return spring 27 to return the guide rod assembly to its initial or rest position.

Figure 5:
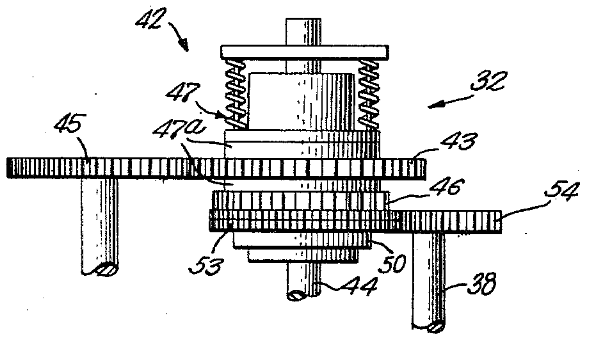
FIGURE 5 is a top plan view of the document feed escapement and servo mechanism.
Figure 6:
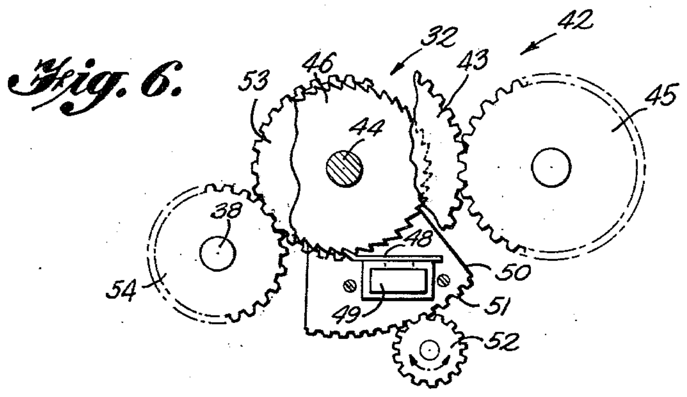
FIGURE 6 is a side elevation of the document escapement and servo mechanism.

The drive for the feed shaft 38 includes a special escapement and servo mechanism, indicated generally by the reference character 42 and illustrated in detail in FIGURES 5 and 6, to provide control of rotation of the feed shaft 38. The control of the feed shaft 38 is designed so as to effect rapid feed of the document through the reading station 13 until the first line of characters to be read is encountered at the reading zone or reading field, to advance the document thereafter through the reading station one line at a time, two lines at a time or three lines at a time as desired, to effect fine adjustment of the position of the line of characters in the reading zone to position it properly by adjustment of the document forward or backward a distance less than one line height, and to effect rapid escape of the document from the reading field when reading has been completed. This escapement and servo mechanism 42 includes an input driven gear 43 supported for rotation on a shaft 44 and continuously driven by an input drive gear 45 to provide driving power for a feed escapement ratchet 46 also supported on the shaft 44. The input driven gear 43 is always trying to drive the feed escapement ratchet 46 through a friction-type clutch 47 having clutch felts 47*a* on opposite sides of the input driven gear 43, one of which is between the input driven gear and the feed escapement ratchet 46. The escapement ratchet 46, however, is normally held fixed by a magnetically controlled pawl 48 controlled by an escape magnet 49 mounted with the pawl on an escape magnet mounting bracket 50. The escape magnet mounting bracket 50 is generally in the form of a sector plate journalled on the shaft 44 for rotation about the axis of the shaft and having gear teeth 51 along the arcuate periphery thereof meshing with the teeth of a servo drive gear 52. The escapement ratchet 46 is designed so that the distance between teeth has an analog correspondence to the distance between single spaced lines on the document. The escape magnet 49 is normally deenergized, in which condition the pawl 48 engages a tooth of the escapement ratchet 46 to restrain the latter against rotation, and is energized by appropriate control pulses generated within the character sensing equipment in a manner hereinafter described to withdraw the pawl from holding engagement with the escapement ratchet 46 and allow the ratchet to travel when powered by the input driven gear 43 through the friction clutch 47. It will be apparent that with this arrangement, an electronic control of the pulse length applied to the escape magnet 49 permits control of the movement of lines the page is allowed to advance.

Movement of the escape ratchet 46 imparts rotation of two anti-backlash gears 53 also supported on the shaft 44, which are coupled with a gear 54 on the feed shaft 38 to power the shaft 38 and the drive wheel 37 at the reading station. Rotation of the drive wheel shaft 38, of course, causes the drive wheel 37 to turn and thereby advance the document since it is held between the drive wheel 37 and clamp lever roller 40.

A pair of carry-away rollers 55 may be provided in the document feed path to receive the document therebetween from the reading station just before the document passes out of engagement with the drive wheel 37 to feed the document into the document processing station 16 where it is directed to the accept pocket 17 or reject pocket 18 depending on the condition of a sorting gate or other suitable mechanism controlled by signals generated by circuits of the automatic character sensing equipment 10.

The control signals for energizing the escape magnet 49 to release the escapement ratchet 46 and permit rotation of the drive wheel 37 through a range of movement to advance the document through the reading station a selected number of lines at a time, or continuously to drive the document out of the reading station, are supplied from a line recognition and skip logic circuit 60 which receives pulses from the character sensing equipment 10 signifying the end of a line of characters or reading zone scan. Such end-of-line pulses may be derived for example from the trailing edge of a horizontal gate signal produced by a sweep mirror cam during sweeping of the mirror 11 in one direction through the reading zone scan. A document advance pulse of selected length initiated by the end-of-line pulse is produced by the line recognition and skip logic circuit 60 to energize the escape magnet 49 and release the ratchet 46 to permit advance of the document by the drive wheel 37. Means are preferably provided to permit alteration of the pulse width applied by the line recognition and skip logic circuit 60 to the escape magnet 49 to release the ratchet 46 for a sufficient period of time to advance the document one, two or three line heights in one step depending on the spacing of lines on the document. For example, the circuit 60 may include means responsive to a signal indicating presence of a document in the reading field and to the end-of-line pulses to supply document advance pulses to the escape magnet 49 to cause the page to be skipped forward one line at a time through the reading station until the presence of the top line of characters is detected in a selected sample area of the reading field. Thereupon the circuit 60 may respond to end-of-line pulses to activate the magnet 49 to skip the page one, two or three lines at a time through the scanning station, depending on the programming of the system, until the end of message is detected by a blank line or a selected number of consecutive blank lines. The circuit 60 may then be operative to skip the document out of the reading field at full speed by continuously energizing the magnet 49.

The particular escapement and servo mechanism 42 herein described also permits fine alignment of the position of the character lines in the scanning field. To this end, a slow locator and servo drive circuit 61 may be provided, which contains integrators for detecting the presence of printing in each of four distinct, vertically spaced zones of a sample area of the reading field. The sample area may be a region about one inch wide at the left margin of the document which is divided into four vertically spaced zones, a top zone, a middle zone, and upper and lower bottom zones located directly above and below the desired position of the bottom of the line of characters in the reading field. A string of relay stages for generating various fixed timing pulses, position error sensing logic means and slow locator logic means may also be included in the circuit 61. For example, the circuit 61 may comprise a time interval marking apparatus such as disclosed in U.S. Patent No. 2,978,643 to David H. Shepard. The function of the slow locator and servo drive circuit 61 is to set on the bottom of the first line entering the reading field and electronically compare this position with a fixed reference pulse. This reference may be established, for example, by initiating a fixed delay from time of the end of scanning of a frame by the scanning disk. An analog signal representing the distance between the actual position of the first line and the position where it should be for exact registration is sent to a servo amplifier 62, which may comprise two remote cut-off pentode mixers preceded by two integrators, the function of the servo amplifier 62 being to integrate the variable width analog error signal produced by the slow locator and servo drive circuit 61 and translate the same into a variable amplitude sine wave which is then applied to one winding of a servo motor 63 driving the servo drive gear 52. A transformer is also provided to apply a fixed phase to the other servo motor winding, and a pentode damper tube is employed to provide D.C. damping of the servo motor for braking.

The servo motor 63 receives a signal from the slow locator and servo drive circuit 61 through the servo amplifier 62, and is driven to rotate the servo drive gear 52 and effect angular adjustment of the escapement magnet mounting bracket 50 about the axis of the shaft 44. The corresponding motion of the bracket 50 effects movement of the escape magnet 49 about the axis of the shaft 44, causing its pawl 48 to drive the escapement ratchet 46, and movement of the ratchet 46 produces rotation of the drive wheel 37 at the reading station to cause the document to slowly move up or down until the line moves into exact registration with the preselected position in the scanning field. This is a fine adjustment and is always less than one line in height. The capability of the servo motor 63 to move in either direction and to thereby move the escape magnet 49 in either direction allows the machine to either advance or back up the document as required. Once the document is properly positioned, the servo motor 63 is locked by a D.C. voltage supplied by the damping pentode and hence the document position in feed is held constant until other improperly registered information is encountered. The servo system then repositions the document so that the printed information is again correctly centered.

Control of the document pickup and advance mechanism is preferably responsive to electronic signals generated in the automatic character sensing equipment when the scanner sees black, signifying passage of the document from the scanning field, to commence another cycle of separating the top document from the input tray 14 and advancing the same to the reading station.

The electronics to provide appropriate signals for cycling of the above-described mechanism to advance the documents from the input tray to the reading station, step the document one line at a time through the reading field until the top line is encountered, adjust the document position to precisely locate the top line in the reading field, step the document one, two or three lines at a time through the reading field until the end of message is detected, continuously drive the document at high speed out of the reading station, and initiate a new document pickup and advancing cycle may take various forms and may be readily designed by persons skilled in the art to provide the desired control of the document feed mechanism. Hence the preceding general description of exemplary circuits for providing these control signals will be sufficient to enable persons skilled in the art to reproduce and practice the invention.

In the operation of the apparatus, a cycle is initiated by a signal from the character sensing apparatus 10 which opens the air valve *26a* to apply suction to the pickup head 23 and lift a document from the document input tray 14. Compressed air is also supplied at this time to the riffler tubes 32 to cause vibration of the documents and dislodge any excess documents attracted to the pickup head 23. The electric clutch 36 is then energized and drive is applied to the feed shaft 29 and gear 30 to advance the pickup head 23 and guide rods 25 toward the reading station tray 19 a sufficient distance to insert the leading edge of the document between the drive wheel 37 and clamp lever roller 40, after which the air valve *26a* is closed and the electric clutch 36 is released to allow the return spring 27 to return the guide rod assembly to its initial position. The document is then held by the clamp lever roller 40 against the concavely curved tray surface 19 in concentric relation to the sweep mirror axis 12 to assure uniform length of optical path during scanning. Advance of the document one line at a time through the reading field is effected by the drive wheel 37 through successive deenergizing of the escape magnet 49 and release of the escapement ratchet 46 until the top line of characters enters the reading field. The slow locator and drive circuit 61 then produces an analog error signal representing the distance between the actual position of the top line and the position where it should be for exact registration, which is applied to the servo amplifier 62 to apply a sine wave of related amplitude to one winding of the servo motor 63 and thereby effect movement of the escape magnet mounting bracket 50 about the axis of the shaft 44 and drive the escapment ratchet 46 and drive wheel 37 in a proper direction and distance to precisely align the top line of characters with the selected portion of the reading field. Reading zone scanning and detailed character scanning of the top line is then completed and the escape magnet 49 is pulsed responsive to signals generated at the end of a reading zone scan to release the escapement ratchet 46 momentarily and permit rotation of the drive wheel 37 to advance the document in a step of one, two or three lines through the scanning field. This scanning and stepping of the document continues until the end of message is detected, whereupon the escape magnet 49 is energized to release the escapement ratchet 46 and permit continuous movement of the document from the reading station.

By means of the mechanism of the present invention, highly reliable feed of the documents one at a time from a stack of documents to the reading station is assured. Positive control of advancement of the document through the reading field at the reading station is maintained by a construction which readily permits stepping of the documents different selected numbers of lines at a time depending upon the programming of the character sensing equipment. Additionally, a convenient control of the means for feeding the documents at the feeding station is provided to effect forward or backward movement of the document relative to the scanning field through less than one line height to provide fine adjustment of the location of the lines relative to the scanning field.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. Apparatus for withdrawing flat paper documents from a stack and advancing the same singly along a document advancement path to a selected reading station to be scanned by a scanning device of automatic character sensing equipment having a scanning member movable about a fixed pivot axis for scanning a line of characters, comprising means for supporting a plurality of documents in flat condition in a vertically aligned stack array, pickup head means movable from a first position overlying a trailing edge portion of the documents in said stack remote from said selected station to a second position spaced along the document advancement path, a document supporting member at said selected reading station having a concavely curved upper surface concentric with said pivot axis for receiving documents advanced thereto to import an upwardly facing concave curvature to such documents concentric with said pivot axis above the same, a transition throat at an entrance end of said supporting member having a guide surface joining said concavely curved upper surface to effect progressive transition of documents advanced therealong from a flat to a concavely curved condition, said pickup head means comprising a block member having a lower document holding surface facing said stack having a cylindrical convex curvature conforming to the curvature of the upper surface of said document support member, suction means coupled to said pickup head means for producing suction conditions at said document holding surface to attract the uppermost document of the stack to an elevated position against said document holding surface and retain the same thereagainst with the adjacent portions of said uppermost document disposed in a cylindrically curved configuration conforming to said document holding surface, and means for moving said pickup head means relative to said document supporting member along a rectilinear reciprocative path generally paralleling said pivot axis while maintaining document retaining suction pressure on said pickup head means to advance a leading edge of a document retained thereby onto said transition throat and to said reading station.

2. Apparatus for withdrawing flat paper documents from a stack for advancement of the same singly along a document advancement path to a selected station comprising means for supporting a plurality of documents in a vertically aligned stack array, pickup head means movable from a first position overlying a trailing edge portion of the documents in said stack remote from said selected station to a second position spaced along the document advancement path, a document supporting member at said selected station having a concavely curved upper surface concentric with a horizontal axis for receiving documents advanced thereto to impart an upwardly facing concave curvature to such documents concentric with said horizontal axis above the same, said pickup head means having a lower document holding surface facing said stack having a cylindrical convex curvature conforming to the curvature of the upper surface of said document support member and concentric with said horizontal axis in axially spaced relation to said document supporting member, suction means coupled to said pickup head means for producing suction conditions at said document holding surface to attract the uppermost document of the stack to an elevated position against said document holding surface and retain the same thereagainst in a cylindrically curved configuration conforming to said document holding surface, and compressed air nozzle means having a discharge opening located adjacent said elevated position and directed towards the edge of any documents held by said pickup head means at said first position for discharging air under pressure edgewise toward such documents to vibrate the same and dislodge from said head means all documents below the topmost document to be returned gravitationally to the stack.

3. Apparatus for withdrawing flat paper documents from a stack for advancement of the same singly along a document advancement path to a selected station comprising means for supporting a plurality of documents in flat condition in a vertically aligned stack array, pickup head means movable from a first position overlying a trailing edge portion of the documents in said stack remote from said selected station to a second position spaced along the document advancement path, a document supporting member at said selected station having a concavely curved upper surface for receiving documents advanced thereto to impart an upwardly facing concave curvature to such documents concentric with a fixed axis above the same, a transition throat at an entrance end of said supporting member having a guide surface joining said concavely curved upper surface to effect progressive transition of documents advanced therealong from a flat to a concavely curved condition, said pickup head means having a lower document holding surface facing said stack having a cylindrical convex curvature conforming to the curvature of the upper surface of said document support member, suction means coupled to said pickup head means for producing suction conditions at said document holding surface to attract the uppermost document of the stack to an elevated position against said document holding surface and retain the same thereagainst in a cylindrically curved configuration conforming to said document holding surface, said pickup head means comprising a pickup head block member, a pair of rectilinear, elongated guide rods rigidly fixed to said block member projecting horizontally toward said reading station to support the block member, a pair of stationary bearings slidably supporting said guide rods for axial reciprocative movement, a rack member fixed to said guide rods, a drive gear having an axis of rotation extending transversely of the path of movement of said guide rods meshed with said rack member, electric clutch means responsive to electrical signals for coupling said drive gear to a rotary drive source to advance said guide rods and pickup head member toward said reading station, and return spring means for returning said guide rods and pickup head member to said first position when said clutch means is deenergized.

4. Apparatus for withdrawing flat paper documents from a stack for advancement of the same singly along a document advancement path to a selected station comprising means for supporting a plurality of documents in a vertically aligned stack array, pickup head means movable from a first position overlying a trailing edge portion of the documents in said stack remote from said selected station to a second position spaced along the document advancement path, a document supporting member at said selected station having a concavely curved upper surface for receiving documents advanced thereto to impart an upwardly facing concave curvature to such documents concentric with a fixed axis above the same, said pickup head means having a lower document holding surface facing said stack having a cylindrical convex curvature conforming to the curvature of the upper surface of said document support member, suction means coupled to said pickup head means for producing suction conditions at said document holding surface to attract the uppermost document of the stack to an elevated position against said document holding surface and retain the same thereagainst in a cylindrically curved configuration conforming to said document holding surface, and compressed air nozzle means having a discharge opening located adjacent said elevated position and directed towards the edge of any documents held by said pickup head means at said first position for discharging air under pressure edgewise toward such documents to vibrate the same and dislodge from said head means all documents below the topmost document to be returned gravitationally to the stack, said pickup head means comprising a pickup head block member, a pair of rectilinear, elongated guide rods rigidly fixed to said block member projecting horizontally toward said reading station to support the block member, a pair of stationary bearings slidably supporting said guide rods for axial reciprocative movement, a rack member fixed to said guide rods, a drive gear having an axis of rotation extending transversely of the path of movement of said guide rods meshed with said rack member, electric clutch means responsive to electrical signals for coupling said drive gear to a rotary drive source to advance said guide rods and pickup head member toward said reading station, and return spring means for returning said guide rods and pickup head member to said first position when said clutch means is deenergized.

References Cited by the Examiner

UNITED STATES PATENTS

| | | | |
|---|---|---|---|
| 615,889 | 12/98 | Parker | 271—42 |
| 1,902,486 | 3/33 | Butler | 250—219.4 X |
| 2,097,587 | 11/37 | Dearing | 271—26 |
| 2,112,341 | 3/38 | Klemm | 271—42 |
| 2,168,559 | 8/39 | Cernak | 271—56 |
| 2,240,423 | 4/41 | Spiess | 271—56 |
| 2,819,074 | 1/58 | Williams | 271—26 |
| 2,995,363 | 8/61 | Pittwood | 271—51 |
| 3,043,589 | 7/62 | Folmar | 271—51 |
| 3,086,770 | 4/63 | Richert | 271—27 |

M. HENSON WOOD, Jr., *Primary Examiner.*

ROBERT A. LEIGHEY, ROBERT B. REEVES, *Examiners.*